US009545988B2

(12) United States Patent
Clark

(10) Patent No.: US 9,545,988 B2
(45) Date of Patent: Jan. 17, 2017

(54) AUTOPILOT NAVIGATION

(71) Applicant: Navico Holding AS, Egersund (NO)

(72) Inventor: Jeremiah Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 14/693,753

(22) Filed: Apr. 22, 2015

(65) Prior Publication Data

US 2016/0311511 A1 Oct. 27, 2016

(51) Int. Cl.
*B63H 25/04* (2006.01)
*G01S 15/02* (2006.01)

(52) U.S. Cl.
CPC ............... *B63H 25/04* (2013.01); *G01S 15/02* (2013.01)

(58) Field of Classification Search
CPC .................................. B63H 25/04; G01S 15/02
USPC ............................................................ 701/21
See application file for complete search history.

(56) References Cited

U.S. PATENT DOCUMENTS

| 1,982,702 | A  | 12/1934 | Sperry, Jr. |
| 5,509,369 | A  | 4/1996 | Ford et al. |
| 5,632,217 | A  | 5/1997 | Ford et al. |
| 5,785,281 | A  | 7/1998 | Peter et al. |
| 6,311,634 | B1 | 11/2001 | Ford et al. |
| 6,696,980 | B1 | 2/2004 | Langner et al. |
| 6,803,860 | B1 | 10/2004 | Langner et al. |
| 6,832,138 | B1 | 12/2004 | Straub et al. |
| 6,842,122 | B1 | 1/2005 | Langner et al. |
| 6,867,711 | B1 | 3/2005 | Langner et al. |
| 6,909,946 | B1 | 6/2005 | Kabel et al. |
| 6,946,976 | B1 | 9/2005 | Langner et al. |
| 8,180,503 | B2 | 5/2012 | Estabrook et al. |
| 8,195,346 | B1 | 6/2012 | Duerksen et al. |
| 8,209,069 | B1 | 6/2012 | McLoughlin et al. |

(Continued)

FOREIGN PATENT DOCUMENTS

GB   2424967 B   2/2008

OTHER PUBLICATIONS

M. Johnson; Need More out of Insight Genesis? Try Biobase; Aug. 14, 2014; website visited Aug. 1, 2016; 8 pgs. https://insightgenesis.wordpress.com/2014/08/14/need-more-out-of-insight-genesis-try-biobase/.

(Continued)

*Primary Examiner* — Anne M Antonucci
(74) *Attorney, Agent, or Firm* — Nelson Mullins Riley & Scarborough LLP

(57) ABSTRACT

Various implementations described herein are directed to a non-transitory computer-readable medium having stored thereon a plurality of computer-executable instructions which, when executed by a computer, cause the computer to: receive a range of headings at a marine electronics device and analyze sonar data received from a sonar device coupled to a vessel to determine a first characteristic measured at a first location. The first characteristic may be a bottom hardness, a bottom composition, a transition between bottom compositions, a water temperature, or a thermocline. The instructions may further cause the computer to: compare the first characteristic to a second characteristic measured at a second location and transmit instructions to an autopilot to move the vessel in a heading in the range of headings. The instructions are based at least in part on the comparison between the first characteristic and the second characteristic.

20 Claims, 7 Drawing Sheets

(56) References Cited

U.S. PATENT DOCUMENTS

| | | |
|---|---|---|
| 8,589,027 B2 | 11/2013 | Hosokawa |
| 2007/0162207 A1 | 7/2007 | Shimo et al. |
| 2008/0039988 A1 | 2/2008 | Estabrook et al. |
| 2009/0037040 A1 | 2/2009 | Salmon et al. |
| 2012/0015566 A1 | 1/2012 | Salmon |
| 2012/0232719 A1* | 9/2012 | Salmon ............... G05D 1/0206 701/2 |
| 2013/0085630 A1 | 4/2013 | Ninomiya et al. |

OTHER PUBLICATIONS

Furuno USA; Product Detail for GP1870F GPS/Chart Plotter/Fish Finder; website visited Aug. 1, 2016; 2 pgs. http://www.furunousa.com/products/productdetail.aspx?product=GP1870F.

* cited by examiner

AUTOPILOT NAVIGATION

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Operators of marine vessels may use instruments to map the water and underwater terrain in the vicinity of the marine vessel, and to detect fish or objects in the water. One or more sonar transducer arrays may be used to map the water and underwater terrain. The map of the underwater terrain within the vicinity of the vessel may be used for navigation purposes.

SUMMARY

Various implementations described herein are directed to a non-transitory computer-readable medium having stored thereon a plurality of computer-executable instructions which, when executed by a computer, cause the computer to: receive a range of headings at a marine electronics device and analyze sonar data received from a sonar device coupled to a vessel to determine a first characteristic measured at a first location. The first characteristic may be a bottom hardness, a bottom composition, a transition between bottom compositions, a water temperature, or a thermocline. The instructions may further cause the computer to: compare the first characteristic to a second characteristic measured at a second location and transmit instructions to an autopilot to move the vessel in a heading in the range of headings. The instructions are based at least in part on the comparison between the first characteristic and the second characteristic.

Various implementations described herein are directed to a non-transitory computer-readable medium having stored thereon a plurality of computer-executable instructions which, when executed by a computer, cause the computer to: receive a selection of a characteristic of a body of water. The characteristic may be a bottom hardness, a bottom composition, a water temperature, or a transition. The instructions may further cause the computer to: receive a location and analyze prerecorded sonar data to determine a route beginning at the location. The route follows the selected characteristic. The instructions may further cause the computer to transmit a set of instructions corresponding to the route to an autopilot for a propulsion system on a marine vessel.

Various implementations described herein are directed to a non-transitory computer-readable medium having stored thereon a plurality of computer-executable instructions which, when executed by a computer, cause the computer to: receive a selection at a marine electronics device in a marine vessel of a characteristic of a body of water. The characteristic may be a bottom hardness, a bottom composition, a water temperature, a thermocline, or a transition. The instructions may further cause the computer to: receive a current location and a search radius, use the current location and search radius to determine a search pattern, transmit a first set of instructions to an autopilot on the marine vessel, wherein the first set of instructions causes the vessel to perform the search pattern, receive sonar data from a sonar device on the marine vessel while the marine vessel performs the search pattern, and compare the received sonar data to the characteristic to determine one or more locations matching the characteristic.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations for autopilot navigation will now be described in more detail with reference to FIGS. 1-7.

Figure 1:
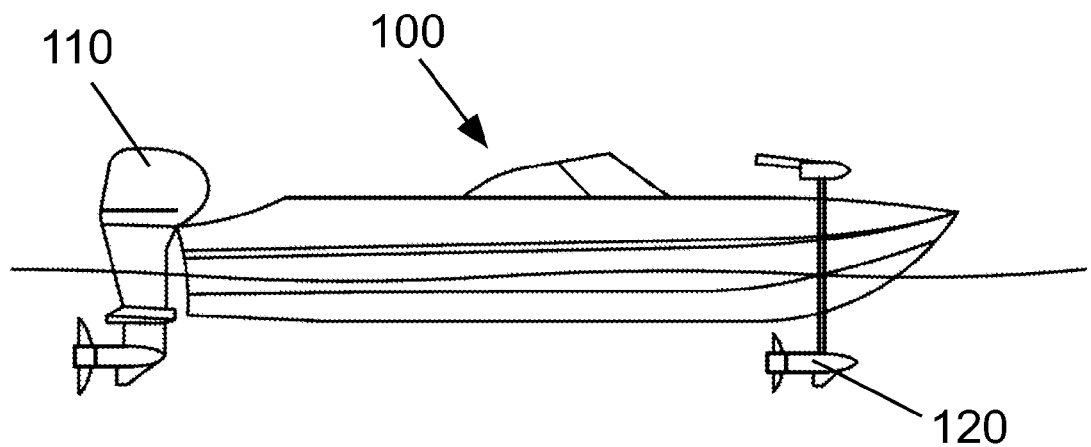
FIG. 1 illustrates a marine vessel in accordance with implementations of various techniques described herein.

FIG. 1 illustrates a marine vessel 100 in accordance with implementations of various techniques described herein. The marine vessel 100 has an outboard motor 110, which may be a gasoline or diesel engine. The marine vessel 100 also has a trolling motor 120. The trolling motor 120 may be used for directional control and localized propulsion. The trolling motor 120 may be a gasoline, diesel, or electric motor. The trolling motor 120 may be quieter than the outboard motor 110. In one implementation, the trolling motor 120 is used to propel and steer the marine vessel 100 while a fisherman on the marine vessel 100 is fishing. Although the marine vessel 100 is illustrated as having an outboard motor 110 and a trolling motor 120, the marine vessel 100 may use any combination of outboard motors, inboard motors, sterndrives, thrusters, jets, pods, trolling motors, or any other type of watercraft motor for propulsion.

Figure 2:
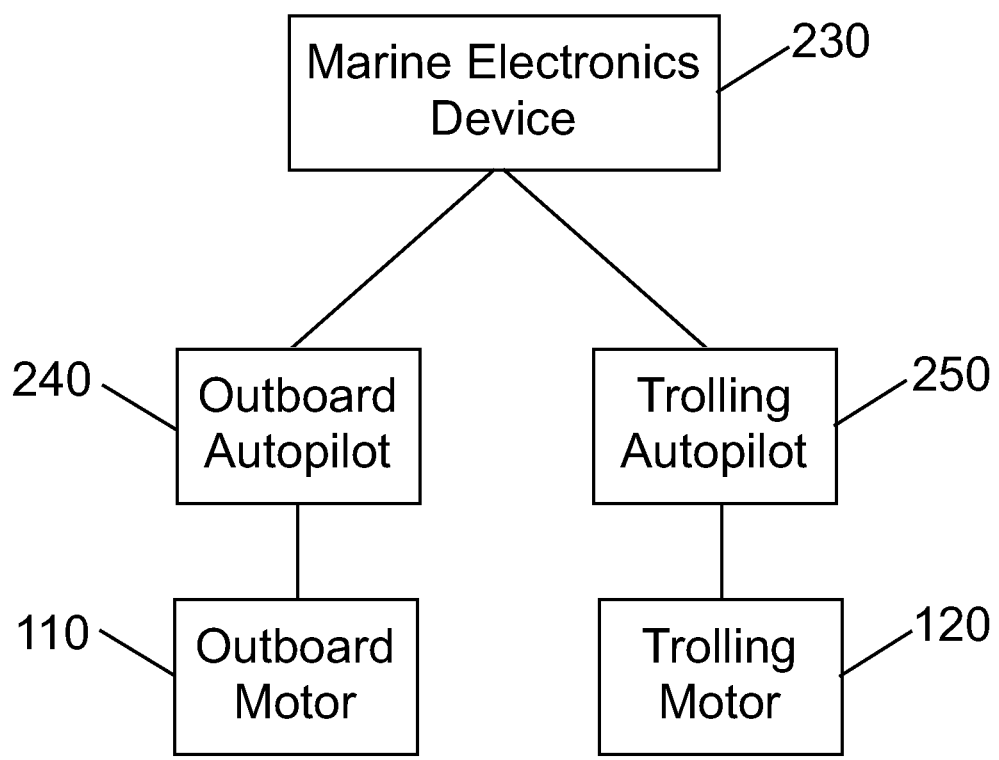
FIG. 2 illustrates a diagram of marine autopilots in accordance with implementations of various techniques described herein.

FIG. 2 illustrates a diagram of marine autopilots in accordance with implementations of various techniques described herein. A marine electronics device 230, further described in FIG. 7, may be attached to or integrated in a marine vessel 100. The marine electronics device 230 may be connected to electronic systems on the marine vessel 100, and may be used to control systems on the marine vessel 100.

The marine electronics device 230 is connected to an outboard autopilot 240 and a trolling autopilot 250. The autopilots 240 and 250 may automatically control a motor. For example, the autopilots 240 and 250 may control the speed and direction of a motor. In another example, coordinates may be transmitted to an outboard autopilot 240, and the outboard autopilot 240 may navigate the marine vessel 100 to the received coordinates. The autopilots 240 and 250 may contain or be connected to Global Positioning System (GPS) units, a compass, or other sensors used for navigating a marine vessel 100. For example, the outboard autopilot 240 may receive location information from a GPS device connected to a network, such as a National Marine Electronics Association (NMEA) 2000 network.

The outboard autopilot 240 is connected to an outboard motor 110. The trolling autopilot 250 is connected to a trolling motor 120. The autopilots 240 and 250 may use hydraulic systems or cable steer systems to steer the motors 110 and 120. In one implementation, an autopilot may be integrated in a motor. For example, the trolling motor 120 may have an integrated trolling autopilot 250. Any number or type of autopilots and motors may be used on the marine vessel 100.

Figure 3:
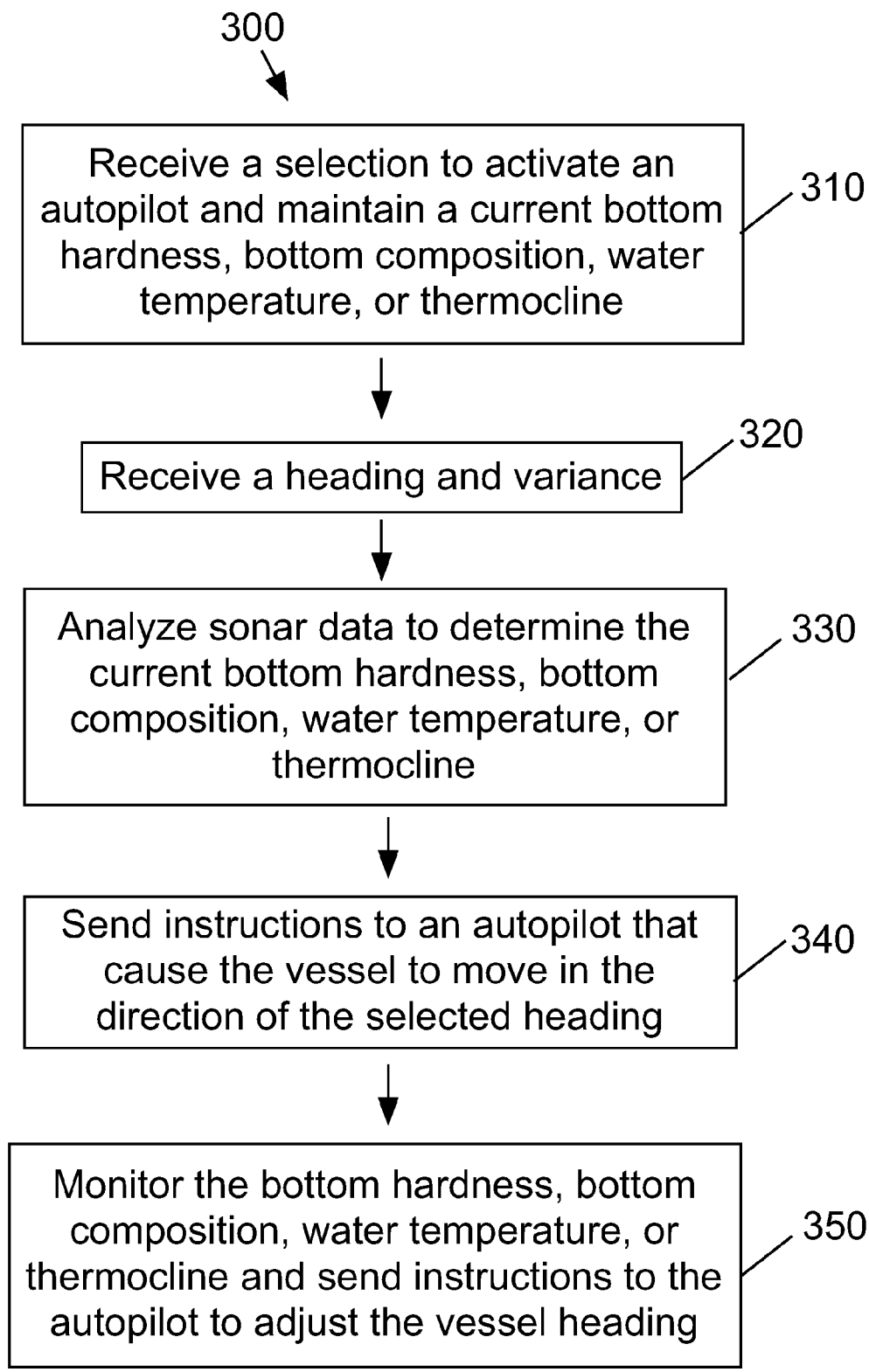
FIG. 3 is a flow diagram of a method for autopilot navigation in accordance with implementations of various techniques described herein.

FIG. 3 is a flow diagram of a method 300 for autopilot navigation in accordance with implementations of various techniques described herein. In one implementation, method 300 may be performed by any computer system 700, including a marine electronics device 230 and the like. It should be understood that while method 300 indicates a particular order of execution of operations, in some implementations, certain portions of the operations might be executed in a different order, or on different systems. Further, in some implementations, additional operations or steps may be added to the method 300. Likewise, some operations or steps may be omitted.

At block 310, a selection may be received for an autopilot to propel a vessel while remaining over an area with a similar characteristic to the current location of the vessel. The characteristic may comprise a bottom hardness, bottom composition type, bottom composition transition, water surface temperature, underwater temperature, thermocline, or combinations thereof. For example, the selection may indicate that the vessel is to remain in water with a temperature that is the same or within a set variance of the water temperature at the vessel's current location. In another example, the selection may indicate that the vessel is to navigate a path that keeps the vessel over vegetation, or a particular type of vegetation.

At block 320, a heading and variance or a range of headings may be received. The heading may describe a preferred heading for the vessel. The variance may describe an allowable offset from the heading for the vessel. For example, if a heading of 143 degrees is received, with a variance of 10 degrees, the vessel may navigate with a heading ranging from 133 to 153 degrees. In this example, the most preferable heading is 143 degrees, and the least preferable headings are 133 and 153 degrees. In another example, a range of 245 to 265 degrees may be received.

At block 330, sonar data or other sensor data may be received and analyzed to measure the current bottom hardness, bottom composition, water temperature, or thermocline under or around the vessel at the current location. For example, sonar may be used to detect that there is gravel beneath the vessel. In another example, the sonar may be used to detect that the vessel is traveling over a transition between gravel and sand, or between a hard surface and a soft surface.

At block 340, instructions may be sent to one or more autopilots instructing the autopilots to move the vessel in the direction of the selected heading. The instructions may comprise messages, sets of instructions, commands, configurations, sets of coordinates, headings, or any other input for controlling an autopilot. For example, a set of instructions may be sent to a trolling motor autopilot to propel the vessel with a heading of 46 degrees.

At block 350, the bottom hardness, bottom composition, water temperature, or thermocline may be monitored, and the vessel heading may be adjusted based on the monitored characteristic by sending instructions to the one or more autopilots. For example, if the temperature measured at block 330 is 48 degrees, and the current temperature of the water beneath the vessel is 44 degrees, the vessel heading may be adjusted so that the vessel returns to 48 degree water. In this example, the heading of the vessel may remain within the range of headings received at block 320.

Figure 4:
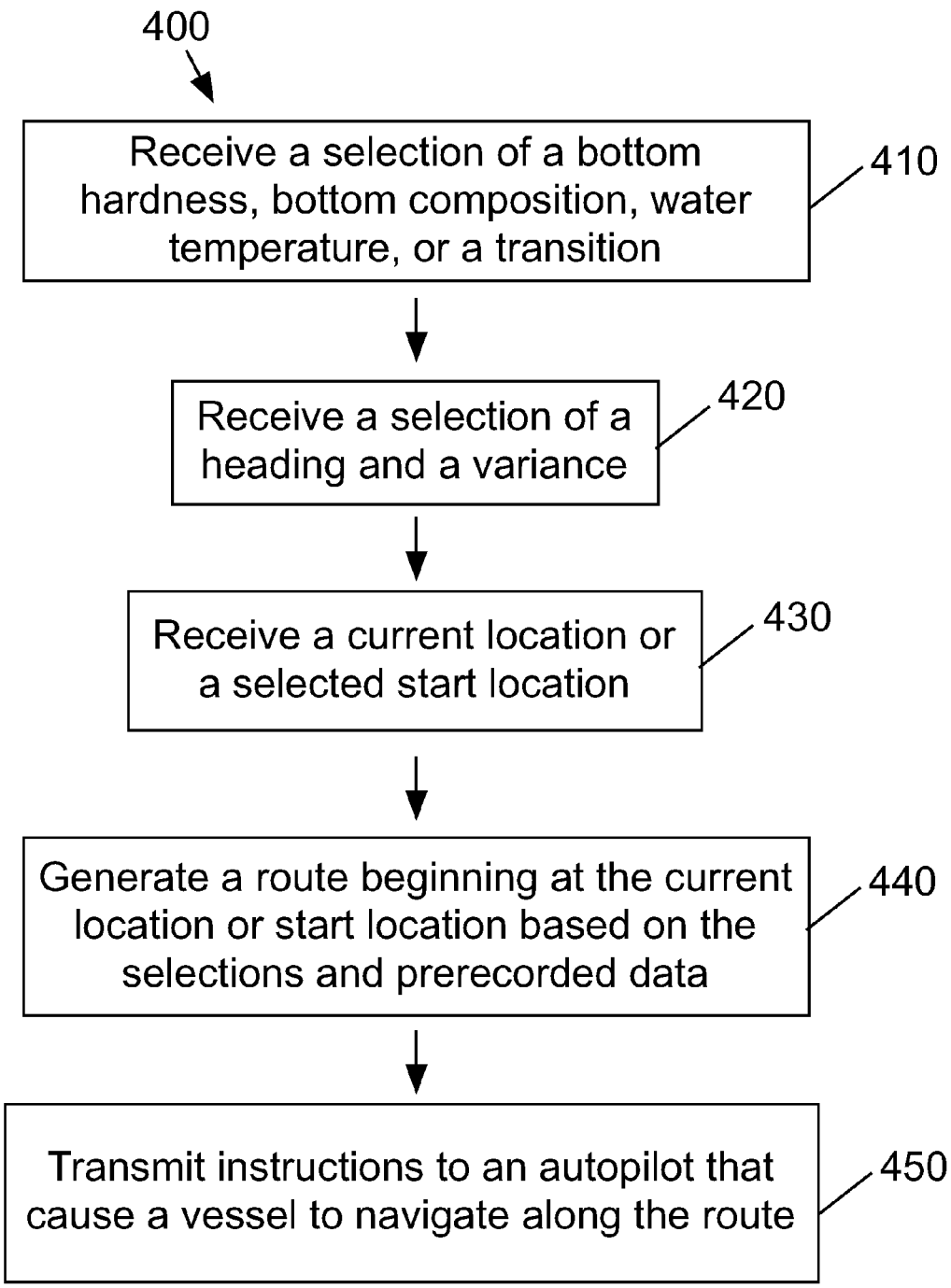
FIG. 4 is a flow diagram of a method for creating autopilot routes in accordance with implementations of various techniques described herein.

FIG. 4 is a flow diagram of a method 400 for creating autopilot routes in accordance with implementations of various techniques described herein. In one implementation, method 400 may be performed by any computer system 700, including a marine electronics device 230 and the like. It should be understood that while method 400 indicates a particular order of execution of operations, in some implementations, certain portions of the operations might be executed in a different order, or on different systems. Further, in some implementations, additional operations or steps may be added to the method 400. Likewise, some operations or steps may be omitted.

At block 410, a selection of a bottom hardness, a bottom composition, a water temperature, a thermocline, a transition, or any combination thereof may be received. For example, a user may select a bottom composition of vegetation.

At block 420, a selection of a heading and a variance or a range of headings may be received. The steps performed at block 420 may be similar to those performed at block 320.

At block 430, a current location or a selected start location may be received. For example, a user may select a waypoint as a start location. In another example, a current location may be measured using a GPS. In one implementation, the user may select an area, and a start location may be determined within the selected area.

At block 440, a route may be generated based on the selection received at block 410, prerecorded sonar data, the heading and variance received at block 420, and the location received at block 430. The route may navigate a vessel over areas with the characteristic selected at block 410. The route may keep the vessel along the heading received at block 420 or within the range of headings received at block 420. For example, if a user selected a muddy bottom composition at block 410, a route may be generated that keeps the vessel over a muddy bottom composition while following the heading selected at block 420. The route may begin on or near the start location received at block 430.

The prerecorded data used to generate the route may be data that was collected by one or more sonar devices during previous fishing trips. The prerecorded data may be data collected by sonar or other instruments on multiple vessels. For example, multiple vessels may upload sonar data to a cloud server to form the prerecorded data. The prerecorded data may comprise records describing GPS coordinates, a bottom hardness, a bottom composition, a water temperature, or other measurements corresponding to a body of water.

At block 450, instructions may be transmitted to one or more autopilots that cause the vessel to navigate along the route generated at block 440. In one implementation, the route may be adjusted based on sonar data or other measurements received while the vessel traverses the route. For example, if a user selected a temperature of 45 degrees, and the prerecorded data at a location had a temperature of 45 degrees, but the measured temperature at that location is 40 degrees, the route may be adjusted to return to water with a temperature of or closer to 45 degrees.

Figure 5:
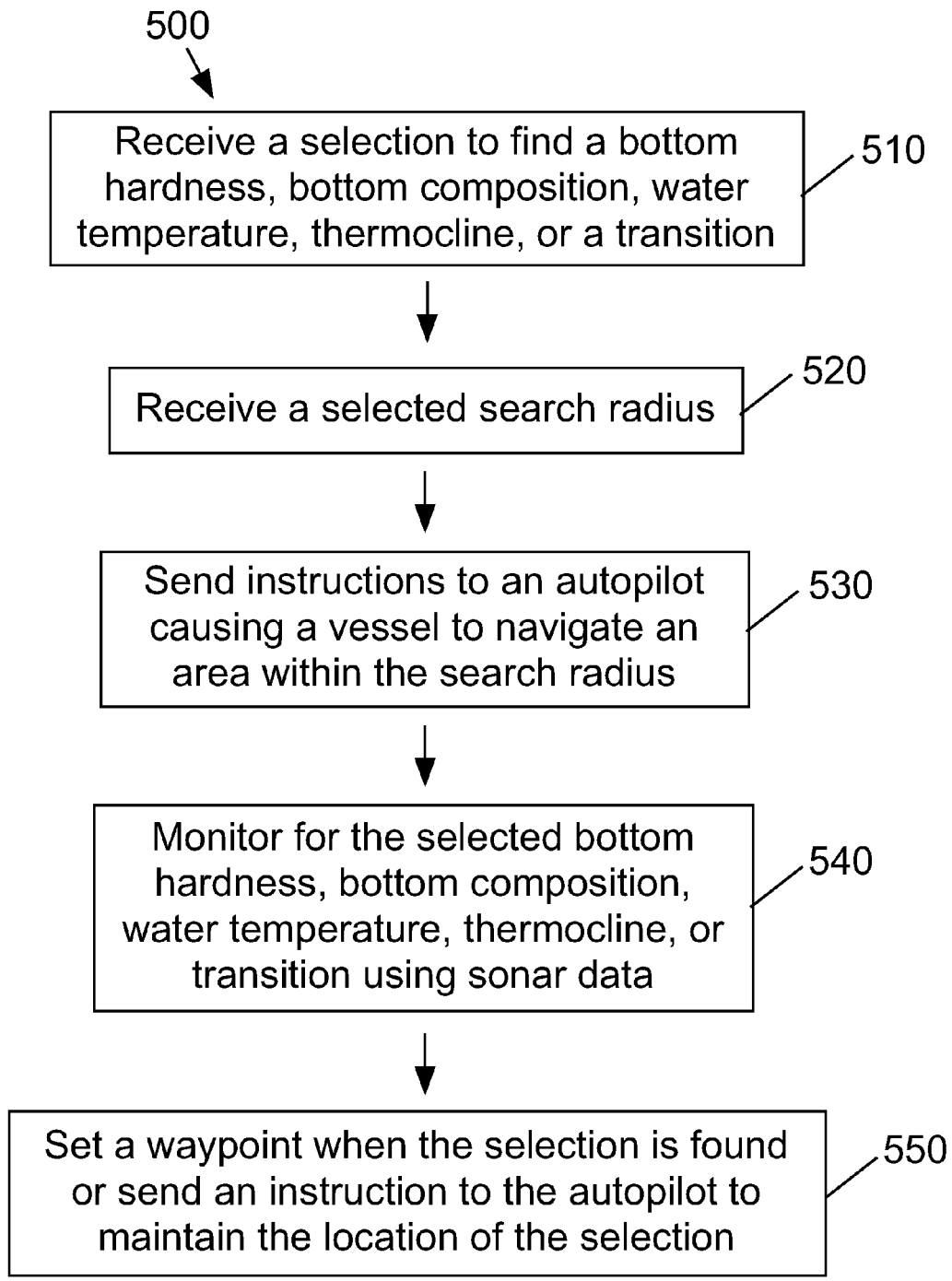
FIG. 5 is a flow diagram of a method for finding a location using a search pattern in accordance with implementations of various techniques described herein.

FIG. 5 is a flow diagram of a method 500 for finding a location using a search pattern in accordance with implementations of various techniques described herein. In one implementation, method 500 may be performed by any computer system 700, including a marine electronics device 230 and the like. It should be understood that while method 500 indicates a particular order of execution of operations, in some implementations, certain portions of the operations might be executed in a different order, or on different systems. Further, in some implementations, additional operations or steps may be added to the method 500. Likewise, some operations or steps may be omitted.

At block 510, a selection of a bottom hardness, bottom composition, water temperature, thermocline, transition, or any combination thereof may be received. For example, a user may make a selection instructing a navigation system to move the vessel over a thermocline with a layer of warm water underneath a layer of cooler water. In one implementation, block 510 may be performed before a fishing trip. In another implementation, block 510 may be performed during a fishing trip, i.e., while a vessel is on the water.

At block 520, a selection of a search radius may be received. For example, a selection of 1 km or less from the current location may be received. In another example, an area may be drawn or selected on a display.

At block 530, instructions may be transmitted to one or more autopilots that cause the vessel to navigate within the search radius or area selected at block 520. For example, a search pattern may be generated based on the selection received at block 520, and instructions may be transmitted to the autopilot to perform the search pattern.

At block 540, sonar data may be received and analyzed to monitor for a location with the attribute selected at block 510. For example, a sonar may be used to measure the water temperature beneath the vessel, or measure layers with different water temperatures beneath the vessel, i.e., thermoclines.

Block 550 may be performed when a location with the attribute selected at block 510 is found. A waypoint may be set corresponding to the location with the selected attribute. For example, if a user selects a temperature of 43 degrees, waypoints may be placed at locations where the measured temperature is 43 degrees. In one implementation, the vessel may stop at the location, or display or sound an alert. For example, an alarm may sound if the vessel is at a location that matches the characteristic selected at block 510. In one implementation, instructions may be transmitted to one or more autopilots, where the instructions cause the vessel to stay at the location.

Marine Electronics Device

Figure 6:
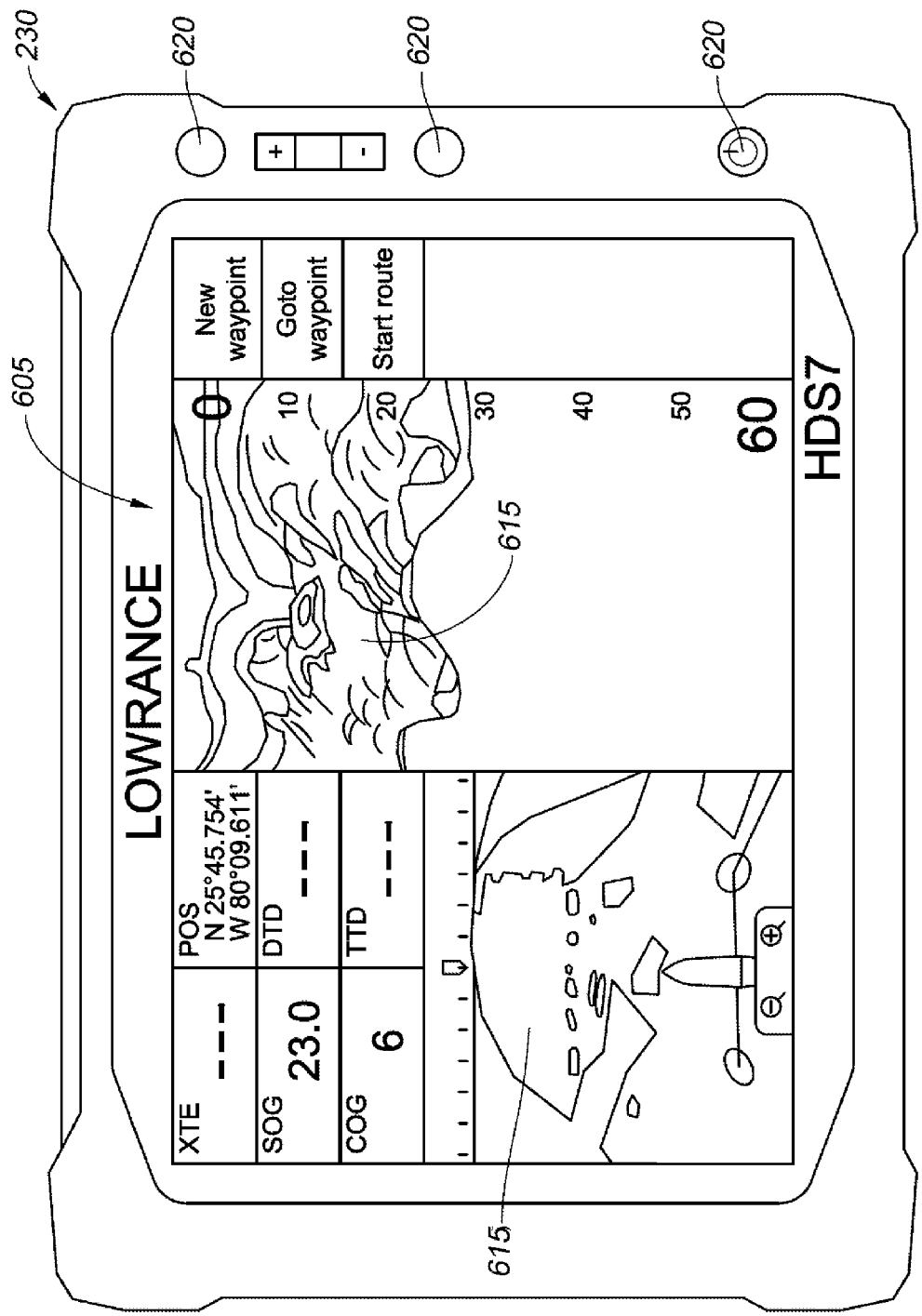
FIG. 6 illustrates a schematic of a marine electronics device in accordance with various implementations described herein.

FIG. 6 illustrates a schematic diagram of a marine electronics device 230 in accordance with various implementations described herein. The marine electronics device 230 includes a screen 605. In certain implementations, the screen 605 may be sensitive to touching by a finger. In other implementations, the screen 605 may be sensitive to the body heat from the finger, a stylus, or responsive to a mouse. The marine electronics device 230 may be attached to an NMEA bus or network. The marine electronics device 230 may send or receive data to or from another device attached to the NMEA bus. For example, the marine electronics device 230 may transmit commands and receive data from a motor or a sensor using an NMEA 2000 bus. The marine electronics device 230 may transmit or receive NMEA 2000 or 0183 compliant messages, messages in a proprietary format that do not interfere with NMEA 2000 or 0183 compliant messages or devices, or messages in any other format. The device 230 may display marine electronic data 615. The marine electronic data types 615 may include chart data, radar data, sonar data, steering data, dashboard data, navigation data, fishing data, and the like. The marine electronics device 230 may also include a plurality of buttons 620, which may be either physical buttons or virtual buttons, or a combination thereof. The marine electronics device 230 may receive input through a screen 605 sensitive to touch or buttons 620.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 7:
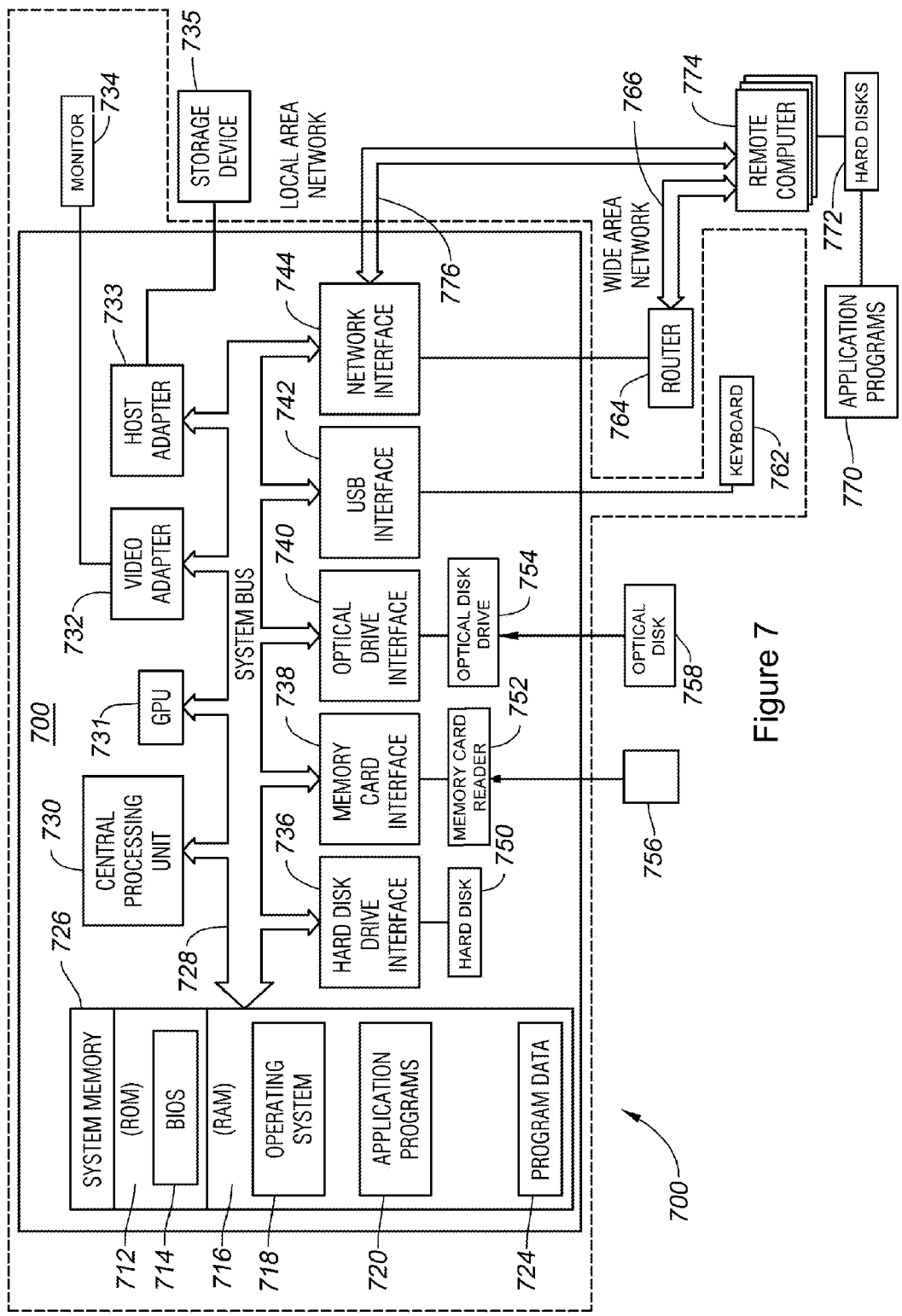
FIG. 7 illustrates a schematic diagram of a computing system in which the various technologies described herein may be incorporated and practiced.

FIG. 7 illustrates a computer system 700 into which implementations of various technologies and techniques described herein may be implemented. Computing system 700 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 700 may include a central processing unit (CPU) 730, a system memory 726 and a system bus 728 that couples various system components including the system memory 726 to the CPU 730. Although only one CPU 730 is illustrated in FIG. 7, it should be understood that in some implementations the computing system 700 may include more than one CPU 730.

The CPU 730 can include a microprocessor, a microcontroller, a processor, a programmable integrated circuit, or a combination thereof. The CPU 730 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 730 may also include a proprietary processor. The CPU may include a multi-core processor.

The CPU 730 may provide output data to a Graphics Processing Unit (GPU) 731. The GPU 731 may generate graphical user interfaces that present the output data. The GPU 731 may also provide objects, such as menus, in the graphical user interface. A user may provide inputs by interacting with the objects. The GPU 731 may receive the inputs from interaction with the objects and provide the inputs to the CPU 730. In one implementation, the CPU 730 may perform the tasks of the GPU 731. A video adapter 732 may be provided to convert graphical data into signals for a monitor 734, which may also be referred to as a screen. The monitor 734 can be sensitive to heat or touching (now collectively referred to as a "touch screen"). In one implementation, the computer system 700 may not include a monitor 734.

The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and each processing unit may include one or more cores.

The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read only memory (ROM) 712 and a random access memory (RAM) 716. A basic input/output system (BIOS) 714, containing the basic routines that help transfer information between elements within the computing system 700, such as during start-up, may be stored in the ROM 712. The computing system may be implemented using a printed circuit board containing various components including processing units, data storage memory, and connectors.

Certain implementations may be configured to be connected to a GPS and/or a sonar system. The GPS and/or sonar system may be connected via the network interface 744 or Universal Serial Bus (USB) interface 742. In one implementation, the computing system 700, the monitor 734, the screen 705 and buttons may be integrated into a console.

The computing system 700 may further include a hard disk drive 736 for reading from and writing to a hard disk 750, a memory card reader 752 for reading from and writing to a removable memory card 756 and an optical disk drive 754 for reading from and writing to a removable optical disk 758, such as a CD ROM, DVD ROM or other optical media. The hard disk drive 750, the memory card reader 752 and the optical disk drive 754 may be connected to the system bus 728 by a hard disk drive interface 736, a memory card interface 738 and an optical drive interface 740, respectively. The drives and their associated computer-readable media may provide nonvolatile storage of computer-readable instructions, data structures, program modules and other data for the computing system 700.

Although the computing system 700 is described herein as having a hard disk 750, a removable memory card 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. The computing system 700 can also be connected to a router 764 to establish a wide area network (WAN) 766 with one or more remote computers. The router 764 may be connected to the system bus 728 via a network interface 744. The remote computers 774 can also include hard disks 772 that store application programs 770.

In another implementation, the computing system 700 may also connect to one or more remote computers 774 via local area network (LAN) 776 or the WAN 766. When using a LAN networking environment, the computing system 700 may be connected to the LAN 776 through the network interface or adapter 744. The LAN 776 may be implemented via a wired connection or a wireless connection. The LAN 776 may be implemented using Wi-Fi technology, cellular technology, or any other implementation known to those skilled in the art. The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774. It will be appreciated that the network connections shown are exemplary and other means of establishing a communications link between the computer systems may be used. The network interface 744 may also include digital cellular networks, Bluetooth, or any other wireless network interface.

A number of program modules may be stored on the hard disk 750, memory card 756, optical disk 758, ROM 712 or RAM 716, including an operating system 718, one or more application programs 720, program data 724 and a database system. The one or more application programs 720 may contain program instructions configured to perform methods 300, 400, or 500 according to various implementations described herein. The operating system 718 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 700 through input devices such as a keyboard 762 and pointing device. Other input devices may include a microphone, joystick, game pad, satellite dish, scanner, user input button, wearable device, or the like. These and other input devices may be connected to the CPU 730 through a USB interface 742 coupled to system bus 728, but may be connected by other interfaces, such as a parallel port, Bluetooth or a game port. A monitor 705 or other type of display device may also be connected to system bus 728 via an interface, such as a video adapter 732. In addition to the monitor 734, the computing system 700 may further include other peripheral output devices such as speakers and printers.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:

receive, at a marine electronics device on a marine vessel, user input indicating one of a desired heading or a range of headings;

receive, at the marine electronics device, user input indicating a selection of at least one marine characteristic to be measured at a current location, wherein the at least one marine characteristic is a bottom hardness, a bottom composition, a transition between bottom compositions, a water temperature, or a thermocline;

receive first sensor data captured at the current location and from a sensor associated with the marine vessel;

determine, from the first sensor data, a first value for the selected marine characteristic at the current location, wherein the current location is a first location;

transmit first instructions to an autopilot for a motor of the marine vessel to operate the motor such that the marine vessel travels according to the desired heading or range of headings;

receive second sensor data captured at a second location from the sensor as the marine vessel is traveling in accordance with the instruction of the autopilot, wherein the second location is different from the first location;

determine, from the second sensor data, a second value for the selected marine characteristic at the second location;

compare the first value and the second value; and transmit second instructions to the autopilot to operate the marine vessel in a heading based at least in part on the comparison between the first value and the second value, wherein:

in an instance in which the second value is within a threshold range with respect to the first value, the second instructions cause the autopilot to operate the marine vessel such that the marine vessel travels at a current heading; and in an instance in which the second value is outside of the threshold range with respect to the first value, the second instructions cause the autopilot to operate the marine vessel such that the marine vessel travels at a new heading that is different than the current heading.

2. The non-transitory computer readable medium of claim 1, wherein the selected at least one marine characteristic is water temperature or an amount of vegetation.

3. The non-transitory computer readable medium of claim 1, wherein the range of headings comprises a heading and a variance.

4. The non-transitory computer readable medium of claim 1, wherein the autopilot is a trolling motor autopilot.

5. The non-transitory computer readable medium of claim 1, wherein the sensor data is sonar data and the sensor is a sonar device.

6. The non-transitory computer readable medium of claim 1, wherein the first and second instructions are instructions for steering the vessel, instructions for increasing or decreasing an amount of thrust, one or more sets of coordinates, or a heading.

7. A system including the marine electronics device with a memory including the non-transitory computer readable medium of claim 1, wherein the system comprises:

the autopilot for the motor for the marine vessel, wherein the autopilot controls the motor to cause the marine vessel to travel in a heading and at a speed;

the sensor associated with the marine vessel, wherein the sensor measures one or more marine characteristics with respect to the underwater environment; and the marine electronics device of the marine vessel, wherein the marine electronics device comprises:

at least one computer;

a communication interface configured to communicate with the autopilot and the sensor; and the memory that stores the non-transitory computer readable medium of claim 1.

8. A non-transitory computer-readable medium having stored thereon a plurality of computer-executable instructions which, when executed by a computer, cause the computer to:

receive, at a marine electronics device on a marine vessel, user input indicating a selection of at least one marine characteristic of a body of water, wherein the marine characteristic is a bottom hardness, a bottom composition, a water temperature, a thermocline, or a transition between bottom compositions;

receive, at the marine electronics device, user input indicating one of a desired heading or a range of headings;

receive, at the marine electronics device, a location for the body of water;

determine, from prerecorded sensor data for the location, a first value for the selected marine characteristic at the selected location;

analyze the prerecorded sensor data to determine a route that includes a plurality of locations, wherein the route begins at the selected location and according to the desired heading or the range of headings, wherein each of the plurality of locations of the route has a value for the selected marine characteristic that is within a threshold range of the first value; and transmit, to an autopilot for a motor of the marine vessel, a set of instructions, whereby the autopilot operates the motor based on the set of instructions such that the marine vessel travels along the route.

9. The non-transitory computer readable medium of claim 8, wherein the user input indicating one of a desired heading or a range of headings indicated the range of headings, and wherein the route is determined so as to maintain the vessel within the indicated range of headings.

10. The non-transitory computer readable medium of claim 8, wherein the prerecorded sensor data is prerecorded sonar data that was previously collected by one or more sonar devices associated with the marine vessel.

11. The non-transitory computer readable medium of claim 8, wherein the prerecorded sensor data is retrieved from a cloud computing service.

12. The non-transitory computer readable medium of claim 8, wherein the autopilot is a trolling motor autopilot.

13. The non-transitory computer readable medium of claim 8, wherein the computer-executable instructions further cause the computer to:

receive sonar data from a sonar device associated with the marine vessel while the marine vessel travels along the route; and transmit instructions to the autopilot to modify the route based on the received sonar data.

14. The non-transitory computer readable medium of claim 13, wherein the computer-executable instructions further cause the computer to:

determine, from the sonar data, a second value for the selected marine characteristic; and determine that the second value is outside of a threshold range with respect to the first value.

15. A system including the marine electronics device with a memory including the non-transitory computer readable medium of claim 8, wherein the system comprises:

the autopilot for the motor for the marine vessel, wherein the autopilot controls the motor to cause the marine vessel to travel in a heading and at a speed;

the sensor associated with the marine vessel, wherein the sensor measures one or more marine characteristics with respect to the underwater environment; and the marine electronics device of the marine vessel, wherein the marine electronics device comprises:

at least one computer;

a communication interface configured to communicate with the autopilot and the sensor; and the memory that stores the non-transitory computer readable medium of claim 8.

16. A non-transitory computer-readable medium having stored thereon a plurality of computer-executable instructions which, when executed by a computer, cause the computer to:

receive, at a marine electronics device in a marine vessel, user input indicating a selection of at least one marine characteristic of a body of water and a desired value of the at least one marine characteristic, wherein the at least one marine characteristic is a bottom hardness, a bottom composition, a water temperature, a thermocline, or a transition between bottom compositions;

receive, at the marine electronics device, user input indicating a search radius;

detect the current location of the marine vessel;

determine, based on at least the current location and the search radius, a search pattern, wherein the current location is a first location;

transmit, to an autopilot for a motor of the marine vessel, a first set of instructions, whereby the autopilot operates the motor based on the first set of instructions such that the marine vessel travels according to the search pattern;

receive, while the marine vessel performs the search pattern, sensor data captured at a second location within the search pattern and from a sensor device on the marine vessel;

determine, from the sensor data, a second value for the selected marine characteristic at the second location; and determine if the second value is within a threshold range with respect to the desired value.

17. The non-transitory computer readable medium of claim 16, wherein the computer-executable instructions further cause the computer to generate a waypoint at the second location in an instance in which the second value is within a threshold range with respect to the desired value.

18. The non-transitory computer readable medium of claim 16, wherein the computer-executable instructions further cause the computer to transmit, to the autopilot, a second set of instructions, whereby the autopilot operates the motor based on the second set of instructions such that the marine vessel maintains position at the second location in an instance in which the second value is within a threshold range with respect to the desired value.

19. The non-transitory computer readable medium of claim 16, wherein the computer-executable instructions further cause the computer to activate an alarm in an instance in which the second value is within a threshold range with respect to the desired value.

20. A system including the marine electronics device with a memory including the non-transitory computer readable medium of claim 16, wherein the system comprises:

the autopilot for the motor for the marine vessel, wherein the autopilot controls the motor to cause the marine vessel to travel in a heading and at a speed;

the sensor associated with the marine vessel, wherein the sensor measures one or more marine characteristics with respect to the underwater environment; and the marine electronics device of the marine vessel, wherein the marine electronics device comprises:
  at least one computer;
  a communication interface configured to communicate with the autopilot and the sensor; and
  the memory that stores the non-transitory computer readable medium of claim 16.

* * * * *